United States Patent
Shoshan

(10) Patent No.: US 10,275,460 B2
(45) Date of Patent: *Apr. 30, 2019

(54) SYSTEM AND METHOD FOR ENSURING THE QUALITY OF A TRANSLATION OF CONTENT THROUGH REAL-TIME QUALITY CHECKS OF REVIEWERS

(71) Applicant: One Hour Translation, Ltd., Nes Ziona (IL)

(72) Inventor: Ofer Shoshan, Rehovot (IL)

(73) Assignee: One Hour Translation, Ltd., Nes Ziona (IL)

( * ) Notice: Subject to any disclaimer, the term of this patent is extended or adjusted under 35 U.S.C. 154(b) by 191 days.

This patent is subject to a terminal disclaimer.

(21) Appl. No.: 15/391,309

(22) Filed: Dec. 27, 2016

(65) Prior Publication Data
US 2017/0109346 A1    Apr. 20, 2017

Related U.S. Application Data

(63) Continuation-in-part of application No. 14/750,755, filed on Jun. 25, 2015, now Pat. No. 9,779,372.

(51) Int. Cl.
*G06F 17/28* (2006.01)
*G06Q 10/06* (2012.01)

(52) U.S. Cl.
CPC ... *G06F 17/2854* (2013.01); *G06Q 10/06395* (2013.01); *G06Q 10/063112* (2013.01)

(58) Field of Classification Search
None
See application file for complete search history.

(56) References Cited

U.S. PATENT DOCUMENTS

| | | |
|---|---|---|
| 6,278,967 B1 | 8/2001 | Akers et al. |
| 6,760,695 B1 | 7/2004 | Kuno et al. |
| 7,653,531 B2 | 1/2010 | Sneddon |
| 8,185,375 B1 | 5/2012 | Kumar et al. |

(Continued)

OTHER PUBLICATIONS

U.S. Appl. No. 14/750,755 of One Hour Translation, Ltd., filed Jun. 25, 2015.

(Continued)

*Primary Examiner* — Satwant K Singh
(74) *Attorney, Agent, or Firm* — Carrie M. Stroup

(57) ABSTRACT

Computer systems, methods, and media for guaranteeing the quality of a language translation of content by using a computer network of human and/or machine translators and human reviewers of the original translation. The accuracy and quality of the original translation by a translator is ensured by a translation service provider computer system breaking the original translation into parts, and incorporating fabricated errors into a percentage of the parts while keeping the remaining parts unaltered. Incompetent reviewers are automatedly identified based on their ability to detect the system's fabricated errors. The system then performs an analysis on the remaining unaltered parts rated by the remaining competent reviewers to determine if the quality of the original translation meets a set standard. The translation service provider and the customer are not required to know: the target language; the accuracy of the human or machine translator; and/or, the accuracy of each translation reviewer.

20 Claims, 11 Drawing Sheets

(56) References Cited

U.S. PATENT DOCUMENTS

| | | |
|---|---|---|
| 8,326,598 B1 | 12/2012 | Macherey et al. |
| 8,527,521 B2 | 9/2013 | Shoshan |
| 9,069,759 B2 | 6/2015 | Shoshan et al. |
| 9,529,797 B2 | 12/2016 | Shoshan et al. |
| 9,639,527 B2 | 5/2017 | Shoshan et al. |
| 9,779,372 B2 * | 10/2017 | Shoshan .......... G06Q 10/06395 |
| 2002/0198699 A1 | 12/2002 | Greene et al. |
| 2007/0129935 A1 | 6/2007 | Uchimoto |
| 2007/0219774 A1 | 9/2007 | Quirk et al. |
| 2007/0294076 A1 | 12/2007 | Shore |
| 2008/0183459 A1 | 7/2008 | Simonsen |
| 2008/0195372 A1 | 8/2008 | Chin et al. |
| 2009/0157386 A1 | 6/2009 | Zhou |
| 2009/0198487 A1 | 6/2009 | Wong et al. |
| 2011/0077935 A1 | 3/2011 | Viswanadha et al. |
| 2011/0082683 A1 | 4/2011 | Soricut et al. |
| 2011/0307495 A1 | 12/2011 | Shoshan |
| 2012/0284015 A1 | 11/2012 | Drewes |
| 2012/0330643 A1 | 12/2012 | Frei et al. |

OTHER PUBLICATIONS

Office Action dated Feb. 9, 2017 in connection with U.S. Appl. No. 14/750,755.
Office Action dated Jul. 19, 2012 in connection with U.S. Pat. No. 8,527,521.
Office Action dated Jun. 25, 2013 in connection with U.S. Pat. No. 8,527,521.
Office Action dated Aug. 24, 2017 in connection with U.S. Appl. No. 14/750,755.

* cited by examiner

TABLE 1
Generated errors

I. Sentence / string level

1. Replace translation with machine translation
   2. Swap translations of string N with that of string M
   3. Show the source as translation (instead of the real translation)

II. Word level

1. Duplicate word
   2. Delete word
   3. Swap words
   4. Insert random word
   5. Insert random word from the source language
   6. Insert random word from another language (not source nor target)

III. Letter level

1. Duplicate letter/symbol
   2. Delete letter/symbol
   3. Swap letter/symbol (inside a word or between words)
   4. Insert random letter/symbol
   5. Swapping digits in numbers (e.g. 18 -> 81)
   6. Swap between letters that look like digits and digits (e.g. I and 1, 0 and O, etc.)
   7. Swap look related letters (sound alike/ look alike) e.g. e<>i, S<>C, i<>Y, a<>o, n<>m IV. Other errors 1. Switch between in / on / at / by, to / for etc.
   2. Remove "The"

FIG. 9

SYSTEM AND METHOD FOR ENSURING THE QUALITY OF A TRANSLATION OF CONTENT THROUGH REAL-TIME QUALITY CHECKS OF REVIEWERS

CROSS-REFERENCE TO RELATED APPLICATIONS

This application claims priority to, and is a continuation-in-part application of, U.S. application Ser. No. 14/750,755, filed on Jun. 25, 2015, the contents of which are incorporated herein by reference in their entirety.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

TRADEMARKS DISCLAIMER

The product names used in this document are for identification purposes only. All trademarks and registered trademarks are the property of their respective owners.

FIELD OF THE DISCLOSURE

The present disclosure relates to the field of ensuring the quality of original human and/or machine translations of content. More specifically the invention relates to the field of guaranteeing the quality of a human and/or machine translation of content using a computer network of translation graders (i.e. "reviewers") and automated methods of determining the reliability of each reviewer, and thus the original translation, in real-time by inserting textual errors into the original translation.

BACKGROUND OF THE DISCLOSURE

In today's global economy, obtaining a high-quality translation of content (e.g. text, graphic design, document layout, etc.) from an original source language to a target language becomes more and more important. While there are many machine, computer based, translation systems, such as Google® Translate, professional human translators are still needed to produce an accurate, high-quality translation. Unfortunately, human translators often err and produce an inadequate translation. The common solution today is to have a proofreader, editor, or translation reviewer read the translated content and correct it as needed. This solution is expensive, slow and inadequate.

Language translation of textual content is also a complicated process due to a variety of factors, such as syntax, semantics, and language ambiguity that occurs in various aspects in natural language processing, e.g. lexical ambiguity, case ambiguity and referential ambiguity. Therefore, to ensure a high-quality translation, a translator must translate into a language that they are fluent in both written and oral form, and they must also have a sufficient technical knowledge of the field being translated in order to have a full understanding of the subject matter. It is no wonder, then, that translations by professional translators are often of variable quality, and why machine translations are normally riddled with errors.

A bad translation can cause significant damage; sometimes even a single word can drastically change the meaning of the entire paragraph. Machine translation solutions are often not accurate enough and the existing methods for evaluating translation quality are cumbersome, slow and expensive. Usually a supervising proofreader (i.e. a translation reviewer) checks the translation and corrects it if errors are found. A single proofreader may not locate all the errors in the translation especially if he or she is under time pressure.

The level of quality of a given translation is hard to determine as it is a very subjective matter. In essence, a translation is considered to be of "good quality" if enough people with control of both the source (i.e. original) content and the target (i.e. translated) content consider it to be an accurate and succinct translation. But, with the existing methods, submitting a project for proofreading or review by more than one proofreader will result is unacceptable costs in terms of time and money.

Therefore, there is a need within the art of human and machine language translations for an efficient, economical, reliable, and timely method for a computer system to automatedly evaluate the quality and accuracy of a human or machine language translation.

SUMMARY OF THE DISCLOSURE

The present disclosure is based on a novel computer system, method, and media comprising the use of a plurality of translation reviewers (i.e. reviewers of the quality of a language translation) connected in real-time simultaneously via a computer network (e.g. the Internet) to review the original translation and give their rating on its quality. Incompetent reviewers are easily and automatedly identified by the computer system based on a reviewer's inability to detect fabricated errors that the system inserts into a plurality of strings of the original translation. Then the quality ratings by only the competent reviewers are used by the system to compute a consensus quality rating of the original translation.

One or more embodiments of the present disclosure comprise one or more computer systems, computer implemented methods, and non-transitory computer media to guarantee and/or ensure the quality and accuracy of a language translation of content (e.g. text, media, etc.) using a computer network of human translators and reviewers communicating in real-time with a translation service provider over a network, and/or via a mobile app. The accuracy, and hence the quality, of the human translation is ensured by the translation service provider computer system (and/or its administrator) incorporating the "real-time" quality checks as disclosed herein (e.g. Table 1); and comprising randomly and predefined errors being inserting into one or more strings of a translator's original translation and evaluating if a reviewer detects the errors (e.g. see FIGS. 4A-C, 7 and 8). By using a plurality of reviewers for grading each original translation, while detecting and eliminating reviewers that are not able to detect the inserted translation errors, the accuracy and thus the quality of a translation is guaranteed.

The level of quality (e.g. very high, high, medium, etc. quality of translation) is also controlled, and may be designated by the customer or content author ordering that their translation be evaluated. The system may also set the quality level based on the type of content being translated (e.g. legal contract needs high quality versus advertisement material). The level of translation quality is adjusted by increasing (higher quality) and decreasing (lower quality) the type (random) and amount of errors to be detected by the reviewers throughout the duplicate system translation (FIGS. 4A, 4B); and/or by increasing the type (predefined and random errors) and percentage of strings within a batch-project that receive the fabricated errors (FIG. 4C).

In one or more embodiments (e.g. FIG. 4A), the computer method comprises: 1) the translation service provider computer system (e.g. "the processor") receiving an "original" human translation (e.g. over a computer network and/or on mobile app) and the system processor randomly inserting fabricated errors into the translation; 2) transmitting the original translation (a) with translator or machine translation mistakes, and the original translation (a) with the addition of system inserted fabricated errors (b), to a plurality of human translation reviewers (i.e. "reviewers"), and receiving back a "reviewer rating" on the quality of the translation for both the original translation (a) and the system inserted fabricated error-ridden translation (b); 3) calculating the number of errors detected, and/or missed, by each reviewer within the plurality of reviewers for the system inserted error-ridden translation (b) (or by comparing the grade assigned by a particular reviewer to an average of the other reviewers), and assigning a "competency" rating to each reviewer; 4) when a reviewer's competency rating is below a threshold rating, then omitting this reviewer rating of the original translation (a); and, 5) calculating the "consensus rating" of the remaining competent plurality of reviewers on the quality of the original human translation (a). Additionally, if the consensus rating of the original translation is below the ensured quality level (a threshold rating), then the source text may be sent to another human or machine translator and the steps (1)-(5) repeated.

In another embodiment (e.g. FIG. 4B), the method step (1) supra, is preceded by the computer system processor automatedly breaking the source text that is to be translated into parts (e.g. strings comprising sentences and/or entire paragraphs) and ordering an original translation from a human translator or a machine. The system then receives back the original translation parts and creates two versions for each part: (a) an unaltered part without system errors (but still comprising translator or machine errors); and (b) fabricated error-ridden part that comprises random and/or predefined errors inserted into one or more, or a set percentage/amount, as well as still containing the same translator or machine errors of (a). The reviewer then evaluates a plurality of both types of parts (a), (b) and their competency is determined automatically based on their ability to detect the fabricated errors inserted by the system into the error-ridden parts (b), wherein the ratings (a) of incompetent reviewers is removed. The quality rating assigned to the original translation is then determined by the ratings of the remaining competent reviewers for parts (a).

In another exemplary embodiment (e.g. FIG. 4C), the method comprises in step 1, the translation service provider computer system (e.g. processor) receiving an "original" human or machine translation (e.g. over a computer network and/or on mobile app) comprising translator and machine errors, and breaking the translation into parts (e.g. strings comprising sentences and/or entire paragraphs). In step 2, the computer system receives one or more "predefined errors" from the customer and/or based on the content type, which comprises a specific type of error and/or amount of errors to be inserted into some (a range or designated fraction or percentage—e.g. 20%) of the parts. In step 3, various combinations of strings are combined into different batches; and one or more batches are grouped into projects, wherein each string may comprise one or more translator or machine errors. In step 4, each reviewer within a plurality of reviewers is assigned to grade one project. In step 5, the translation service provider computer inserts the predefined errors and random errors into some (a range or designated fraction or percentage) of the strings within each reviewer's project, and one project is electronically transmitted to each translation reviewer electronic computing device. It is also envisioned that the order of steps may be rearranged as long as there is an overlap of each unaltered string being graded by about 70-90% (plus or minus 5%) of the reviewers, and about 10-30% of each reviewer's project comprising strings with fabricated errors that may be the same or different than other reviewer's working on the same translation job but assigned a different project comprising different batches.

In step 6, the computer system receives back a "reviewer rating" (e.g. passed quality test—Yes or No; Correct or Incorrect) from each reviewer for each string within their assigned project comprising: no system inserted errors (i.e. unaltered) but possibly with translator or machine errors; or inserted system fabricated errors ("error-ridden") and possibly with translator or machine errors. In step 7, the computer performs a project-batch review to assign a competency rating to each reviewer based on the reviewer's ability to detect the system inserted fabricated errors. When a reviewer's competency rating is below a threshold, then the processor omits the reviewer's rating of the unaltered parts of the original translation within their assigned batches-project that lack system inserted errors but which may still comprise translator or machine errors.

In step 8, the computer system computes a consensus quality rating of the unaltered strings from the original translation within the remaining projects-batches of the competent reviewers, and notifies the customer if the original translation passes the quality/accuracy test (e.g. good or bad translation). If the translation does not pass the test, the source text may be sent to another translator or machine to be translated again and to repeat the process of steps 1-8.

An aspect of the various embodiments disclosed herein (e.g. FIGS. 4A-4C) is the fact that the system does not require the user (e.g. network translation service provider, content author-customer) to know: 1) the target language; 2) the reliability and accuracy of the human or machine translator hired for the translating job; and/or, 3) the reliability and accuracy of any one reviewer within a plurality of reviewers who are grading the translator or machine (2).

Another aspect is the ability to designate the level of quality required for an original human or machine translation by adjusting parameters or factors within the system. The level of quality is adjusted for a variety of factors, such as: amount billed to the customer for the translation service (i.e. higher the fee, higher the guaranteed quality of the translation); amount of time available to conduct the translation; importance of content (e.g. text) that is being translated and/or the customer (e.g. intended use of translation—e.g. legal contract versus advertisement); and so forth.

And system parameters that are adjustable comprise, by way of non-limiting examples: the number of reviewers used in rating the quality of the original human translation; altering methods of inserting random and predefined errors into the original translation (omitting strings; switching strings; etc.); altering the number of errors to be detected, and/or missed, by a reviewer (e.g. higher the number of errors, higher the quality rating); etc.

Another aspect is the ability to calculate and assign a competency rating to a reviewer by a variety of methods, such as (e.g. see FIG. 5): 1) automatedly calculating the number of errors detected, and/or missed, by a reviewer and assigning a grade or a pass/fail designation; 2) calculating the "reviewer relative rating" of the translation (e.g. "Good, OK, Bad, Correct" or "Yes of No"), and comparing this to the consensus, average, mean, median, or mode rating of the other reviewers; and 3) calculating the competency rating using different types of errors and assigning a relevancy weight designating the importance of each type (e.g. reviewer detection of a missing string is weighed higher than detection of switched strings, or vice versa).

Another aspect of the present disclosure is to objectively determine the competence of a specific reviewer within a plurality of reviewer, using the crowd sourcing methods disclosed herein.

Another aspect is to objectively determine if the performance of a specific reviewer has increased or decreased over time so that appropriate action can be taken to remedy the situation.

The various embodiments may further comprise a computer program product tangibly embodied in a computer-readable storage device and comprising instructions that, when executed by a processor, perform one or more methods disclosed herein. For example, the computer program product may comprise a mobile application with a translation module accessible on a customer's, a translator's and/or a reviewer's (client) electronic computing device comprising a non-transitory computer readable storage medium comprising instructions, the instructions being operable to enable the electronic computing device to perform all of or parts of the steps of the methods disclosed herein. The mobile app of the present disclosure that is used on a customer's electronic computing device can electronically send and receive communications for ordering a translation (e.g. about translation notifications), and may further communicate directly with one or more translator's electronic computing device, and/or one or more reviewer's electronic computing device.

The mobile app of the present disclosure on a reviewer's electronic computing device (e.g. FIG. 6) can also: receive project notifications; view the original translation and strings thereof, comprising translator or machine errors; and/or the error-ridden translation, or strings thereof, comprising system inserted predefined and random errors; and provide a quality rating for both and/or identify errors in the error-ridden translation; invite other reviewer's to rate a translation project; and/or electronically communicate directly with a translator and/or a customer device.

And the mobile app of the present disclosure on a translator's electronic computing device can: receive a project notification comprising content to translate; input and transmit the translation; fix existing translations; invite other translators to the project; and/or communicate directly with the customer and one or more reviewers of their project.

The mobile app may also be used, for example, by a content author (i.e. system customer) who desires to ensure the quality of a translation of his content that was translated by him or another translator or machine, by directly sending the translation to a plurality of reviewers after the mobile app (or networked computer) automatedly inserts errors into the translation, or parts of the translation. The mobile app will then collect the plurality of reviewers' ratings of the original content and the error-ridden content, and automatedly compute a competency rating for each reviewer and a consensus rating for the translation by the designated competent reviewers. The mobile app will then display on the content author's electronic computing device whether the translation is of the requested level of quality, and if not, recommend that the author obtain another translation from a different source, such as another translator or machine within the system's network of translators. Or, the mobile app can be setup to automatically order another translation from a different machine or translator, such as one who specializes in the target language and subject matter of the content.

BRIEF DESCRIPTION OF THE DRAWINGS

The various embodiments of the present disclosure and its different aspects and advantages will be better understood from the following detailed description of preferred embodiments of the embodiments with reference to the following drawings.

FIG. 9 is a Table 1 comprising a list of different types of fabricated random errors that the translation service provider computer and/or administrator inserts into a fraction of the strings or parts of the original translation.

DETAILED DESCRIPTION OF EXEMPLARY EMBODIMENTS

Glossary of Terms

Figure 1:
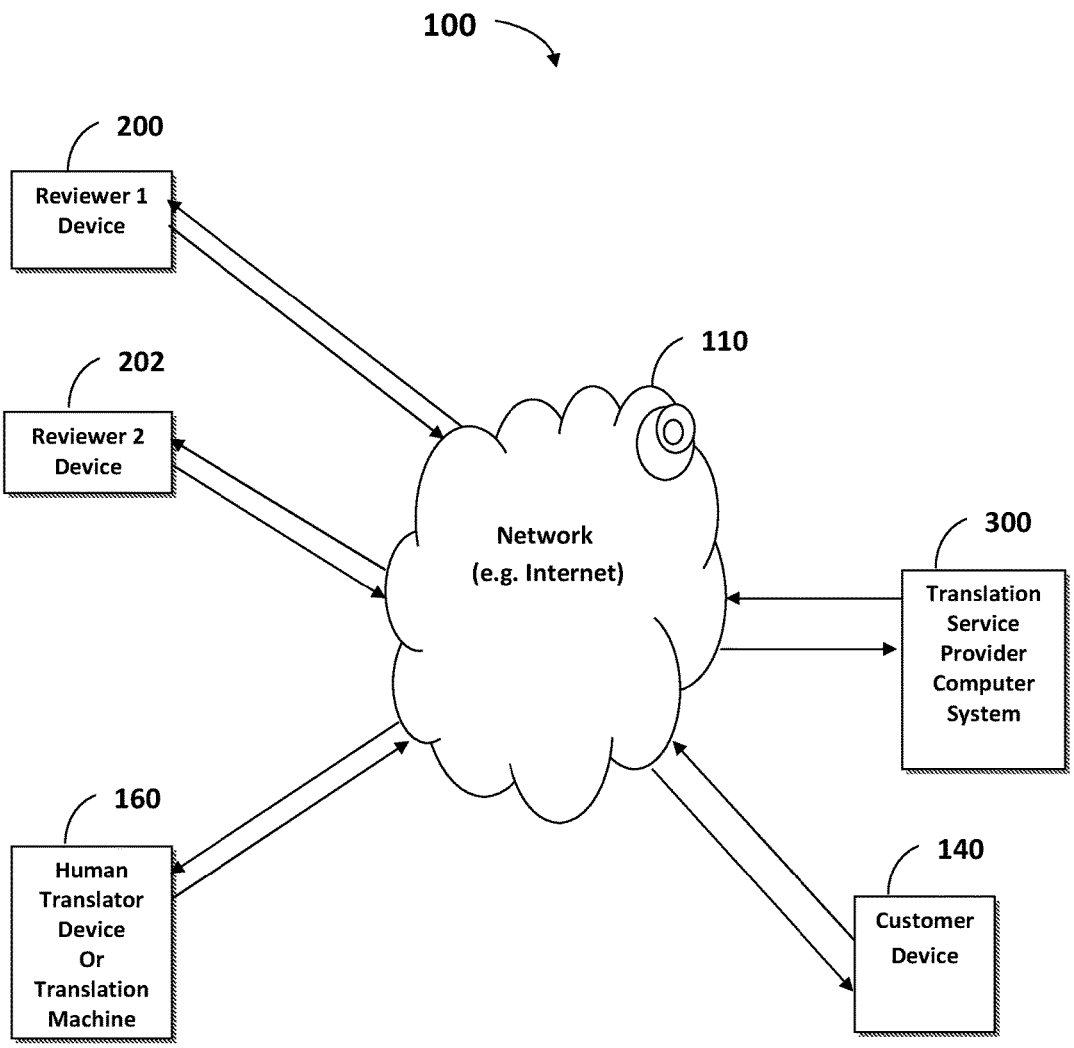
FIG. 1 is a block diagram representing an embodiment of the computer system comprising a translation service provide system, a human translator computing device, a plurality of reviewers computing devices, and a customer computing device, all communicating over a network.

As used herein, the term "Electronic Computing Device" refers to any electronic communications device comprising a central processing unit (i.e. processor) with the Internet connectivity, such as: laptops, desktops, tablets, iPads, smartphones, cell phones, personal digital assistant devices, and the like.

As used herein, the term "Content" refers to any form of digital media that can be translated from an original, source language to a target language. By way of non-limiting examples, content to be translated may comprise one or more of: a textual document, an audio recording, text within images, the textual and image layout of a document or webpage, etc., and any combination thereof. It is understood that one of skill in the art could readily modify the disclosure herein for textual translations to include all forms of content translations.

As used herein, the term "Software" refers to computer program instructions adapted for execution by a hardware element, such as a processor or CPU, wherein the instruction comprise commands that when executed cause the processor to perform a corresponding set of commands. The software may be written or coded using a programming language, and stored using any type of non-transitory computer-readable media or machine-readable media well known in the art. Examples of software in the present disclosure comprise any software components, programs, applications, computer programs, application programs, system programs, machine programs, and operating system software.

As used herein, the term "Module" refers to a portion of a computer program or software, such as a mobile app, and may further comprise the computer hardware that it is installed upon, and that carries out a specific function and may be used alone or combined with other modules of the same program. The module may comprise a native application, a web application, or a widget type application to carry out the methods of detecting and electronically transmitting untranslated character strings. In a one embodiment, a native application is installed on the customer's, reviewer's and/or translator's electronic computing device, wherein it can be downloaded automatically from the Internet. It may be written in a language to run on a variety of different types of devices; or it may be written in a device specific computer programming language for a specific type of device. In another embodiment, a web application resides on the system server and is accessed via the Internet. It performs basically all the same tasks as a native application, usually by downloading part of the application to the device for local processing each time it is used. The web application software is written as Web pages in HTML and CSS or other language serving the same purpose, with the interactive parts in JavaScript or other compatible language. Or the application can comprise a widget as a packaged/downloadable/installable web application; making it more like a traditional application than a web application; but like a web application it uses HTML/CSS/JavaScript and access to the Internet.

As used herein, the term "Application Program Interface (API)" refers to a set of computer programming instructions, for accessing a web based software application or web tool.

As used herein, the term "A System" may be used to claim all, or parts of, the aspects of the present disclosure wherein it refers to the entire configuration, or parts of, the networked based human translation service, e.g. all hardware and software used in all scenarios. Preferred embodiments are illustrated in the system architectures of FIGS. 1-3.

As used herein, the terms "Processing," "Computing," "Calculating," "Determining," "Establishing", "Analyzing", "Checking", or the like, may refer to operation(s) and/or process(es) of a computer, a computing platform, a computing system, a computer central processing unit (CPU), or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

As used herein, the term "Original Translation" refers to a translation of content (e.g. text) performed by a human or machine translator from a source language to a target language, and wherein the computer system processor has not inserted fabricated errors into the translation. The original translation may further comprise one or more errors made by the translator (human or machine).

As used herein, the terms "Fabricated Translation" refers to an original (human or machine) translation wherein the computer system processor and/or its administrator has inserted fabricated errors, random and customer predefined, into one or more, or a plurality of parts (e.g. sentences, paragraphs, strings) of the original translation to create an "error-ridden translation" or parts thereof, which are then used to test the competency of each reviewer that is assigned to grade it. The types of errors may also be assigned a relevancy weight designating the importance of each type (e.g. translator detection of a missing string is weighed higher than detection of switched strings, or vice versa). Thus, higher weighted error types will therefore have a higher impact on the reviewer's competency rating. Additionally, the types of errors inserted may comprise: 1) randomly selected errors from of a list of error types (see Table 1); and/or 2) predefined errors based on the type of content and/or by the customer's instructions. By way of non-limiting examples, the predefined errors may comprise: types of errors or content that the customer wants to guarantee are not in their original translation (e.g. offensive language); names of competing products and services and/or registered trademarks of another entity; terms that should not be translated, such as professional terms; and system administrator manually inserted strings with the appearance that they are translated strings.

As used herein, the term "Unaltered Translation" refers to an original translation, or parts thereof, that may comprise one or more translation errors made by a human translator or machine when translating the content in a source language to a target language. The unaltered translation, or parts thereof, does not comprise fabricated random or predefined errors inserted into the original translation, or parts thereof, by the system or its administrator.

System Architecture

The various embodiments disclosed herein may be used in conjunction with, or in lieu of, one or more methods, systems and media for rating human translators and reviewers as disclosed in U.S. Pat. No. 8,527,521 issued Sep. 3, 2013 to Ofer Shoshan entitled "System and Method for Evaluating the Quality of Human Translation Through the Use of a Group of Human Reviewers", the entirety of which is herein incorporated by reference. FIG. 1 is a block diagram representation of a computer implemented system 100 of one embodiment of the present disclosure. System 100 comprises a translation service provider computer system 300 communicating via a network 110 (e.g. the Internet) with: 1) a customer (e.g. content author) computer system and/or electronic computing device 140 for ordering a human translation from system 300; 2) a plurality of human translator electronic computing devices, or translation machines, 160 to generate and transmit back to system 300 an "original human or machine translation"; and, 3) a plurality of translator reviewers (i.e. "reviewer's") electronic computing devices 200, 202, etc. to assess the quality of the transmitted translation. In another embodiment, a mobile app is installed on the customer's device 140, the translator's device 160, and/or the reviewers' devices 200, 202 to carry out some or all the functions of computer system 300.

In the various embodiments, the computing devices-systems 140, 160, 200, 202, and/or 300 communicate via network 110, which comprises a local area network (LAN) or a wide area network (WAN), or a network connection may be made to via an external computer (for example, through the Internet using an Internet Service Provider), and using wired, wireless, and terrestrial or satellite links.

The "quality rating" of the original translation is assessed by the processor of system 300 to determine if it is sufficient (e.g. meets a threshold rating—Excellent, Fair, Good, etc.). In an embodiment, when the processor decides that the quality rating is too low or is insufficient (e.g. does not comply with the customer's order), then the system 300 may automatedly re-order the translation from another human translator. And when the "quality rating" is sufficient, it may be transmitted to the customer device 140 to provide proof of compliance with guaranteeing the quality of the translation ordered.

Another system embodiment includes the use of a mobile app by a user-customer wishing to check the quality of a human translation without contracting with a translation service provider computer 300. The customer device 140 would receive a translation from a translator device 160. The mobile app installed on the customer's (i.e. user's) device 140 would automatedly insert fabricated errors into the translation (or receive a fabricated error-ridden translation from the system 300), and then transmit the original translation and the fabricated error-ridden translation directly to a plurality of reviewers' devices 200, 202, etc. via the network 110. Alternatively, a mobile app installed on the translator's device 160, and/or installed on the reviewers' devices 200, 202, would automatedly insert errors into the original translation to generate the "fabricated error-ridden translation".

The user's device 140 would then receive back the reviewers' consensus rating of the quality of the original translation. If the consensus rating on the quality of the translation did not meet the user's desire, then the user could manually, or the mobile app would automatically, order the translation from another human or machine translator and repeat the process of distributing the translation to a plurality of reviewers.

Figure 2:
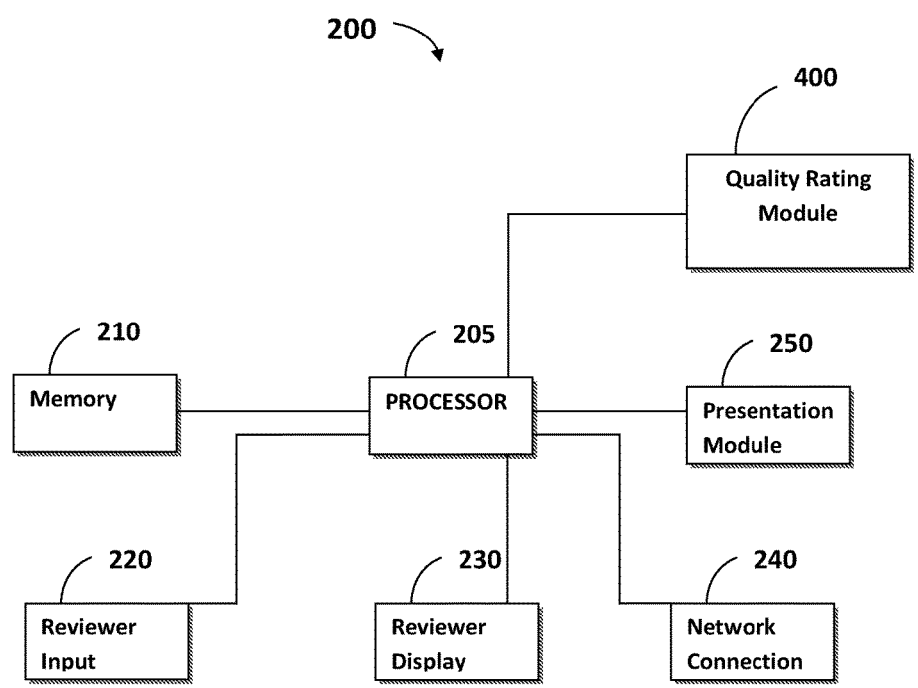
FIG. 2 is a block diagram representing one embodiment of the reviewer's electronic computing device that is used to check the translation project and provide a rating on the quality of the human or machine translation.

FIG. 2 is a block diagram representation of the reviewer's electronic computing devices 200 and 202 in an exemplary embodiment, in which it is understood that there may be a plurality of reviewer devices numbering more than the exemplified 200, 202. The reviewers' device 200 and 202 each receive a project notification comprising the original and error-ridden human translation from the central computer system 300, and/or directly from the translator device 160, and/or directly from the customer device 140, and displays it to the reviewer. Devices 200 and 202 then receive the reviewer's input of the quality rating of the original translation, and the error-ridden translation (or the identification of the errors) and electronically transmit it back to the central system 300 and/or directly to the customer's device 140 and/or the translator's device 160.

The reviewer electronic computing device 200 and 202 (e.g. laptop, tablet, desktop PC, smartphone, PDA, etc.) has one or more processing units (CPUs) 205, one or more memories 210, user input devices—keyboard & mouse—220, graphical user interface (GUI) 230 to display the source text, the original human translation and the error-ridden translation, and a network connection 240. It may further comprise a Presentation module 250 in the mobile app, or accessible via the network, to provide functionality to display side-by-side, and thus can compare, the source text to the original translation and/or the error-ridden translation.

The reviewer device 200 and 202 also has installed on, or accessible via the network 110 from the translation provider computer system 300, a "Quality Rating Module" 400, e.g. within the mobile app. The Quality Rating Module 400 provides functionality to receive the reviewer's input for the identification of errors in the error-ridden translation, and to receive the input for the reviewer's quality rating of the original human translation. The Quality Rating module when installed on the system 300 (e.g. FIG. 3) and/or the device 200, 202 (as a mobile app), may further comprise the ability to automatedly: 1) divide the translation into parts (e.g. sentences, paragraphs, strings) before or after the source text is translated; and, 2) insert fabricated errors into the parts that the reviewer then needs to detect.

Figure 3:
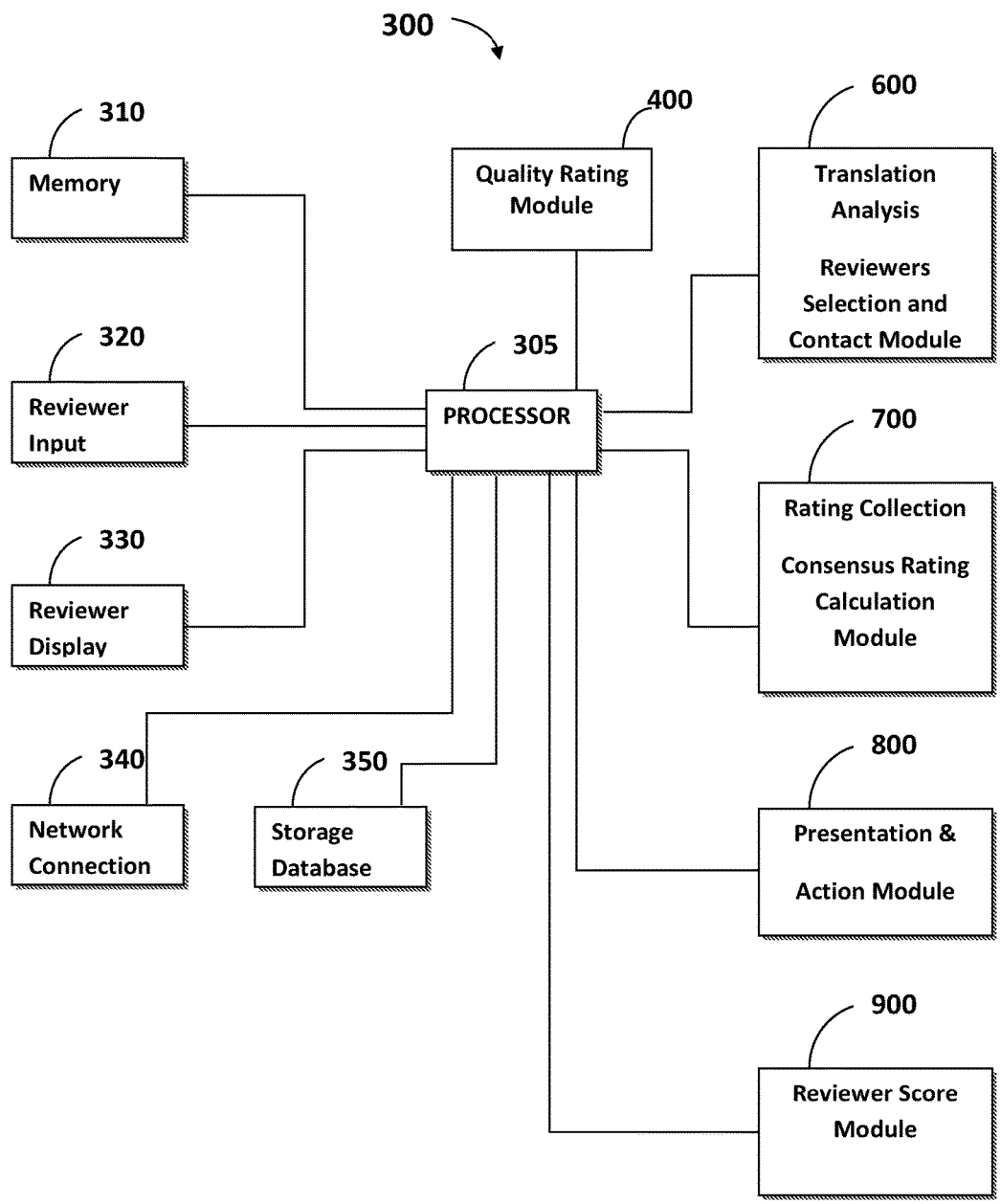
FIG. 3 is a block diagram representing one embodiment of the computer system of the translation service provider, or the mobile app installed on a reviewer's device, comprising optional features.

As illustrated in FIG. 3, the translation provider computer system 300, and/or the mobile app, further comprise main processing modules for selecting qualified translators and reviewers, contacting them via the network, collecting the reviewers' ratings, calculating a competency rating of each reviewer based on their fabricated error-ridden test results, calculating a quality rating on the original translation from a consensus of the competent reviewers, and electronically transmitting the quality rating to the customer electronic computing device 160. Computer system 300 has one or more processing units (CPUs) 305, one or more memories 310, user input devices—keyboard & mouse—320, user-administrator display 330, network connection 340, and storage database 350, e.g. any server computer. The storage database 350 comprises a plurality of human translators' and/or reviewers' records comprising the identity of each translator's and reviewer's language and subject matter expertise, availability, contact information, etc.

The computer system 300, and/or the mobile app running on a user's device, may further execute a Reviewer Selection and Contact module 600, which is used to select qualified reviewers based on their language and subject matter expertise, and to perform the review of the translation. It also identifies and electronically contacts a plurality of reviewers for a specific translation project.

In the various embodiments, the translation project is sent from the customer device 140 to computer system 300, or directly to translator device 160; and then from the translator device 160 to the system 300 or directly to the reviewers' devices 200, 202. It is understood that any combination of transmitting the communications comprising the translations and the translation quality rating is easily adaptable to the skilled artisan. The translation project is analyzed to collect project characteristics, such as source language, target language, type of translation, length, files types, etc. The computer system 300, and/or the mobile app, creates a project profile based on the collected project characteristics that is used to select the reviewers to perform the quality rating. Reviewers are selected based on the project profile of characteristics and on their individual profile stored in the reviewers' data-base 350 connected to or stored on the computer system 300, and or a user's device memory. An individual reviewer profile may comprise a reviewer's areas of expertise, preferences for types of projects, availability, etc. A reviewer is selected if his/her skills meet the project meta-data requirements, e.g. source language and target language, and other parameters like previous reviewer score or competency rating. Each reviewer is alerted of the new translation project by use of electronic communication, for example, email, mobile text message, web-page, instant messenger, and potentially other communication means.

Computer system 300, or the mobile app, may further contain the Rating Collection and Consensus Rating Calculation module 700. This module may be used in conjunction with one or more other modules (e.g. the Quality Rating module 400) to collect ratings from competent individual reviewers and then calculate a quality rating.

Computer system 300, or the mobile app, may further contain the Presentation and Action module 800 to display side-by-side, and thus can compare, the source text to the original translation and/or the fabricate error-ridden translation. It may further provide functionality to send the results to the customer device 140 over the network 110 and take predefined action if the quality rating is too low, such as automatically ordering another translation from a different translator and repeating the process of having a plurality of reviewers grade the translation while identifying and eliminating the quality rating of incompetent reviewers.

Computer system 300, or mobile app, may further contain the Reviewer Score module 900 that is used in conjunction with one or more other modules (e.g. the Quality Rating module 400). This module may be used to review the score, or competency rating, generated by the Quality Rating module 400, and transmit and display a reviewer's results to his/her device 200, 202. The score or rating is subsequently used when reviewers are selected to evaluate and rate the quality of future translation projects.

Non-Transitory Computer Readable Storage Device and/or Media:

The various embodiments disclosed herein may further comprise a non-transitory computer readable storage device or media, which is a physical storage device readable by a machine. The computer readable storage device can store data that is accessible by a computer, such as system 300 or device 140, 160, 200, 202, etc. The computer readable storage device is preferably a non-removable hard drive, but may include a backup Universal Serial Bus (USB) flash drive that can be easily removed and physically transferred to a computer. Other examples include devices such as a magnetic cassette, a flash memory card, a digital video disk, a compact disc, an optical disc, a Bernoulli cartridge, a random access memory (RAM) card, read only memory (ROM) card, and other such storage devices.

The applications or algorithms or modules disclosed herein (e.g. "Quality Rating", "Presentation" modules, etc.) can be stored on computer readable storage device or media (CD, DVD, hard drive, portable storage memory, etc.) of the computing device 200, 202, and/or system 300 and executed by the them.

In general, another innovative aspect of the subject matter described in this specification can be implemented in a computer program product tangibly embodied in a computer readable storage device and comprising instructions that, when executed by a processor, perform one or more methods disclosed herein.

Quality Rating Methodology

Although the disclosure herein for the flowcharts of FIGS. 4A-C and 5 cover textual translations, one skilled in the art could readily adapt the teachings to the translation of any type of content. It is further understood that the steps disclosed in FIGS. 4A-C and 5 may be executed by one or more of the computers in FIGS. 1-3.

Figure 4A:
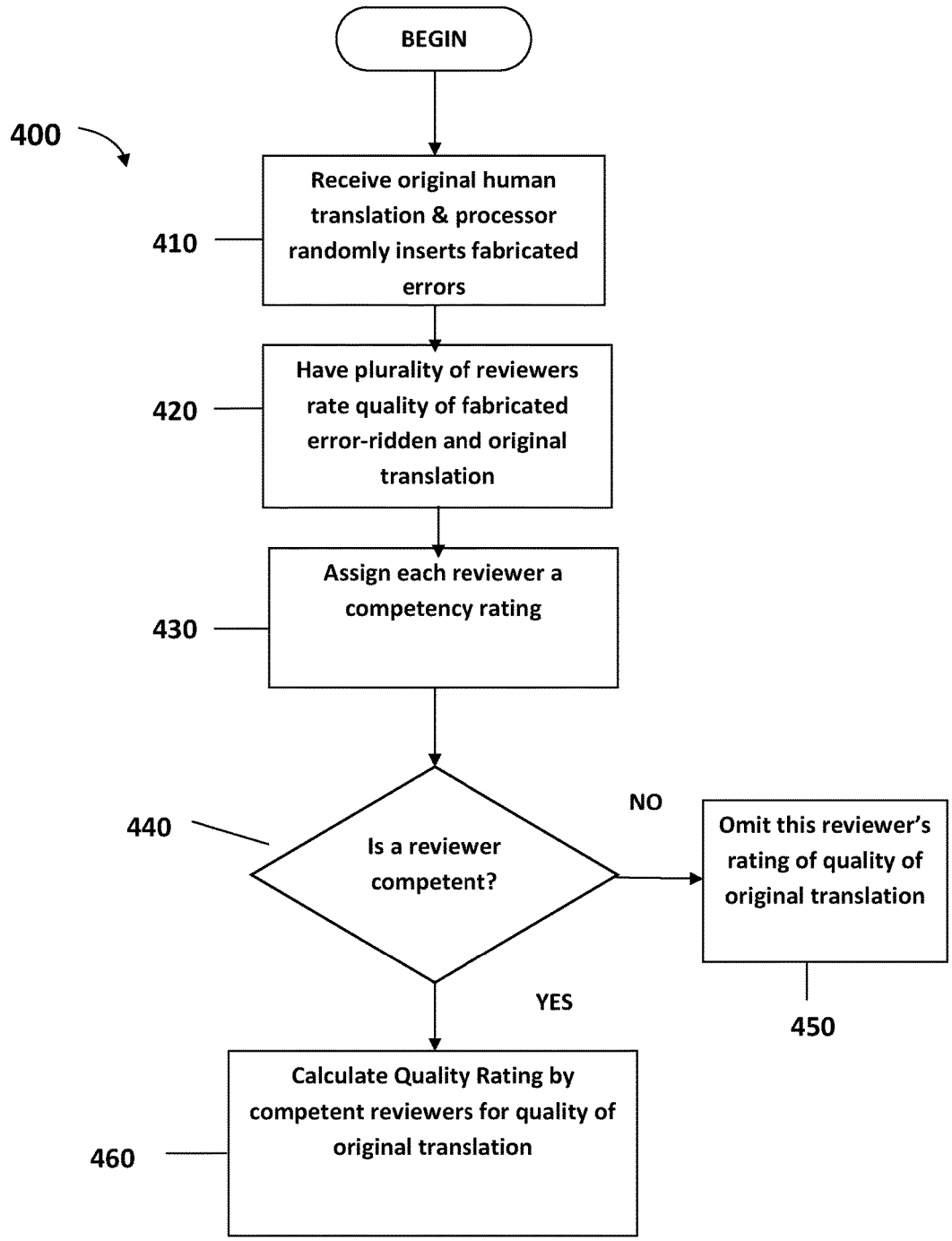
FIG. 4A is an exemplary logic flow and functional block diagram illustrating one embodiment of the method of the present disclosure comprising the system automatedly inserting fabricated errors into the original translation which already may comprise translator or machine errors, and having the reviewer rate both the unaltered original translation and fabricated error-ridden translation.
Figure 4B:
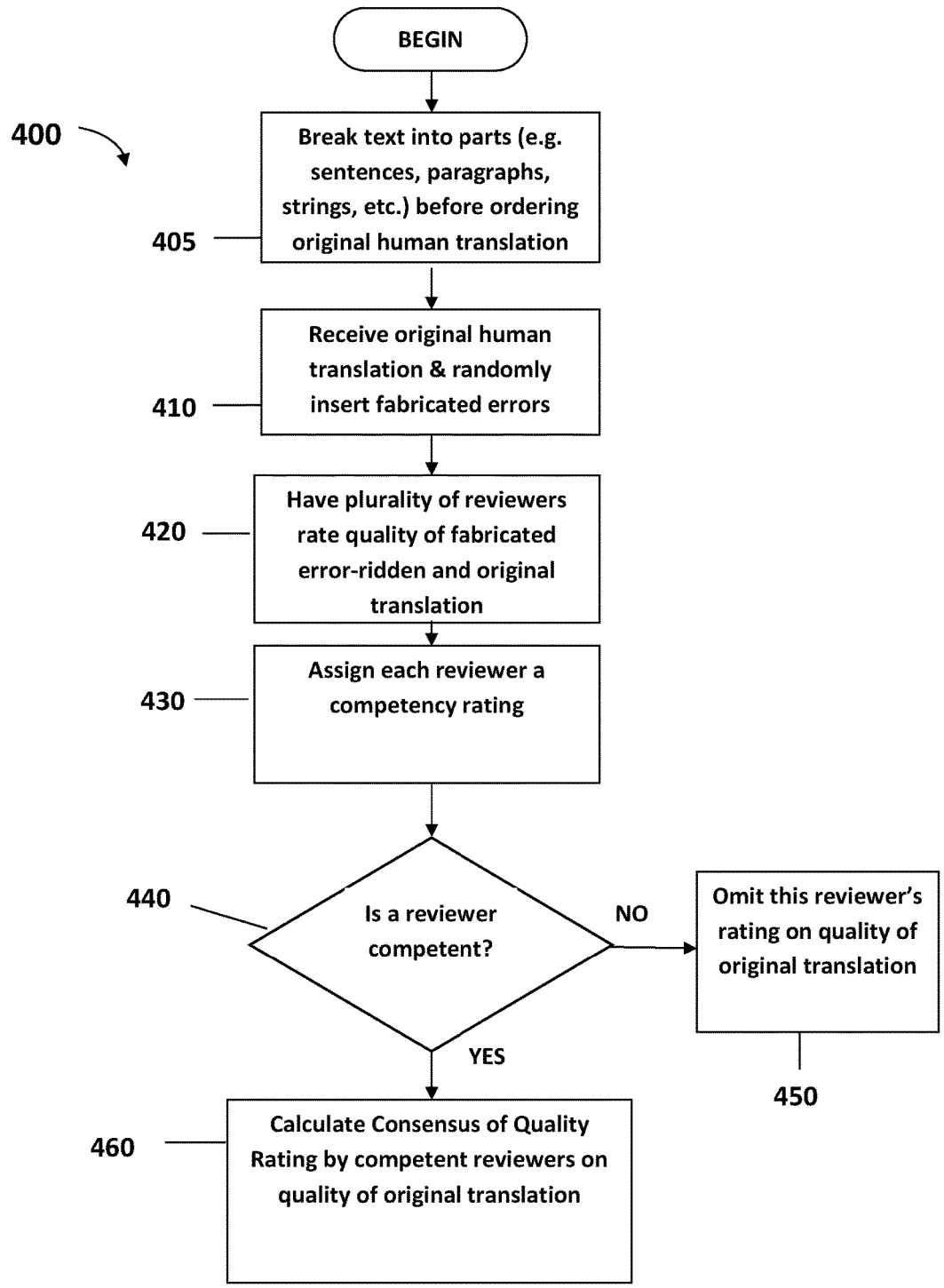
FIG. 4B is an exemplary logic flow and functional block diagram illustrating another embodiment of the method of the present disclosure comprising automatedly breaking the text into parts before it is originally translated.
Figure 4C:
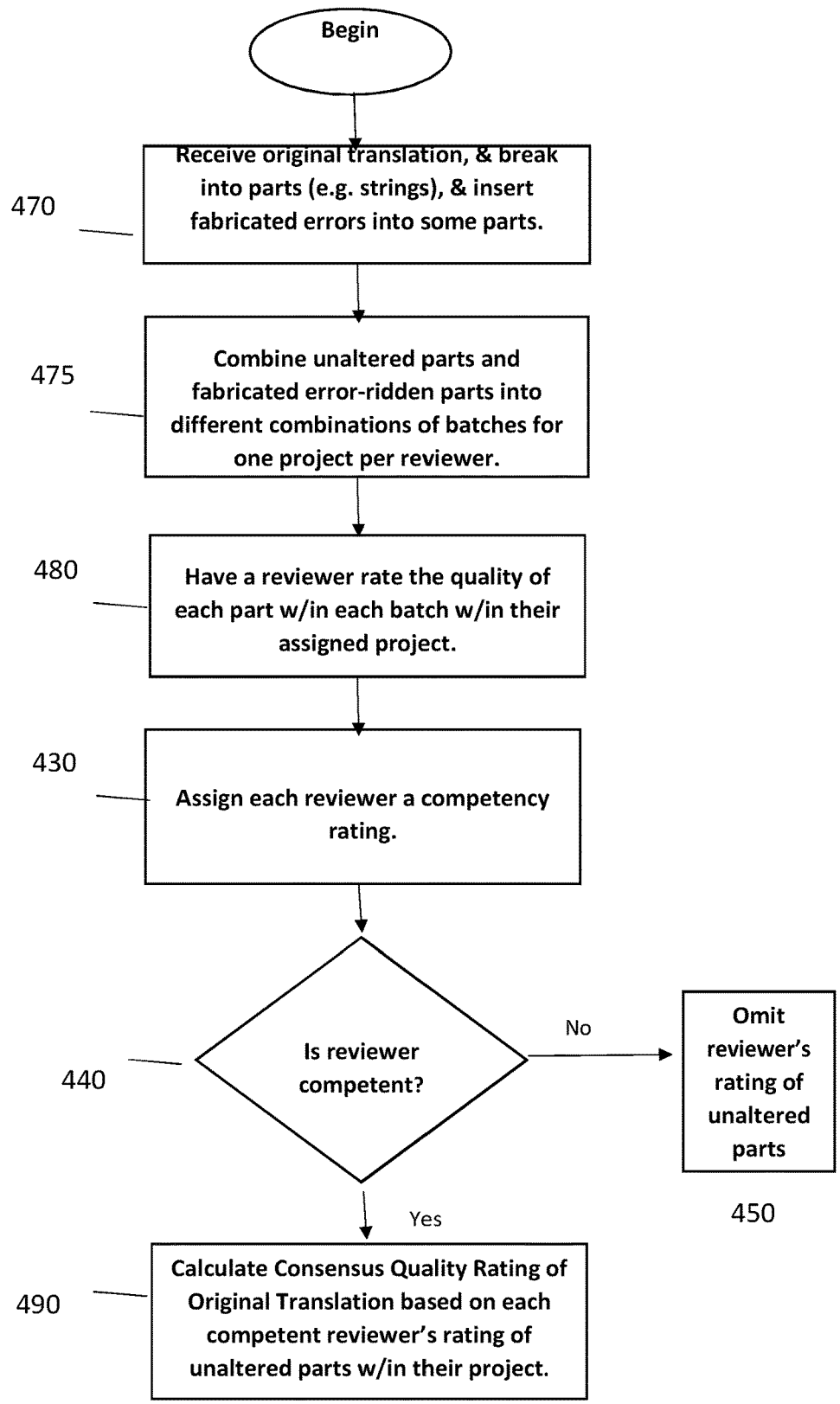
FIG. 4C is an exemplary logic flow and functional block diagram illustrating another method comprising the system inserting errors (fabricated random and customer's predefined errors) into a fraction of the parts (e.g. 10-30%) of the original translation which already may comprise translator or machine errors, and assigning different combination of parts (batches-projects) to different reviewers wherein about 70-90% of the unaltered parts are graded by multiple reviewers.
Figure 5:
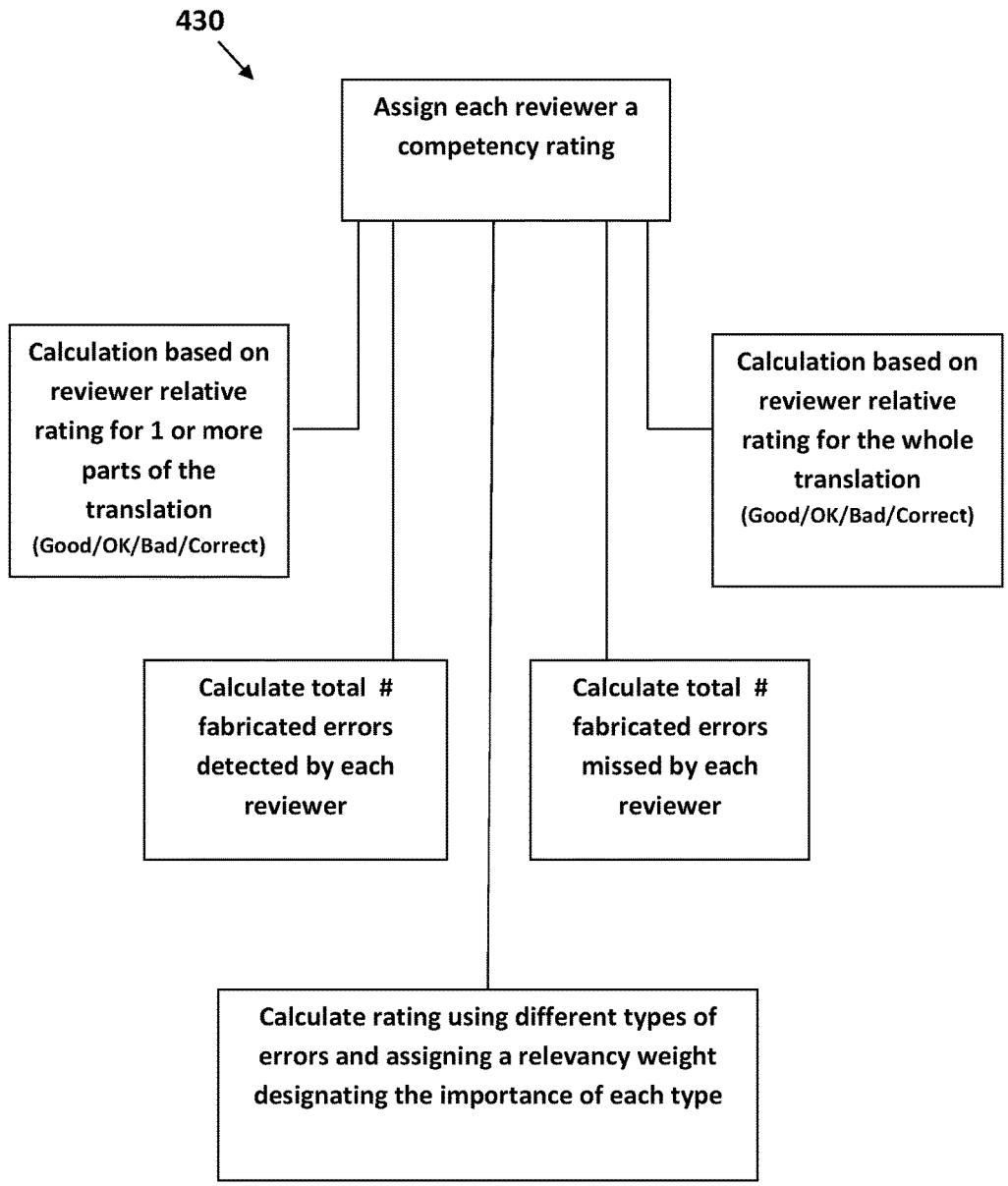
FIG. 5 illustrates exemplary embodiments of alternative methods for assigning each reviewer a competency rating.

FIGS. 4A-C are flowcharts illustrating computer steps conducted by the computerized system 100 in an exemplary embodiment comprising the use of the Quality Rating Module 400 alone or with one or more other modules for FIGS. 2 and/or 3. In step 410, a reviewer's computing device 200, e.g. smartphone with the mobile apps of the present disclosure installed thereon, and/or the translation service provider computer system 300, receives the original human or machine translation from the translator computing device 160, in response to the translation that was ordered from the customer computing device 140 (e.g. via system 300 or directly or directly via the mobile app). The reviewer's device 200 and/or the system 300 then automatedly inserts fabricated errors (random and predefined) into the translated text to generate the "fabricated error-ridden translation".

The translated text may further be broken into "parts" before or after it is originally translated, the parts comprising one of more of: sentences, paragraphs, strings, etc. This may occur, for example: before the source text is sent to be translated, the mobile app on the customer's device 140, and/or the system 300, divides the text into parts (e.g. see FIG. 4B, step 405). Or the text may be broken into parts after the original human translation is received: back at the customer's device 140; at the reviewers' devices 200, 202; and/or at the system 300 (e.g. see FIG. 4A, step 410; FIG. 4C, step 470). Or the text may be inherently broken into parts because of its source (e.g. translations of websites and mobile applications).

The customer's device 140 and/or the translator's device 200 with the mobile app installed thereon, and/or the system 300, may also insert a wide variety of types of pre-defined and/or random errors into the text to produce the "fabricated error-ridden" translation (e.g. see Table 1, FIG. 9). By way of non-limiting examples: a machine translation may be substituted for a part; different parts may be swapped within the same translation; specific words may be substituted with known words that are commonly mistranslated; and so forth. The Quality Rating Module 400 may further comprise computer code designed to insert errors specific to: different types of translations, different levels of quality required, different types of customers, and so forth.

In step 420, the customer's device 140, and/or the system 300, transmits the original human translation and the fabricated error-ridden translation (or parts thereof) to a plurality of reviewer's electronic computing device 200, 202, etc. The reviewers are also instructed to rate the quality of the original human translation (e.g. percentage of 100%; grade A-F; Good/OK/Bad; Correct/Incorrect), and to find errors in the fabricated error-ridden translation. The number of reviewers that are tasked depends on a variety of factors, such as: level of quality needed for the original human translation (e.g. higher the qualities, then more reviewers are tasked); availability of reviewers for specific target language and subject matter expertise of text topic; time allowed to deliver the translation to the customer; etc.

In step 430, customer's device 140 and/or the system 300 receives the reviewers' quality rating for the original human translation, and their error identification input. Based on their test results for detecting the errors in the fabricated error-ridden translation, each reviewer is assigned a Competency Rating (score) based on a variety of methods, which comprise by way of non-limiting examples (e.g. see FIG. 5): 1) automatedly calculating the number of fabricated errors detected, and/or missed, by a reviewer and assigning a grade; 2) calculating the "reviewer relative rating" of the fabricated error-ridden or original translation (e.g. "Good, OK, Bad, Correct, Incorrect"), and comparing this to the consensus rating (average, mean, median, mode, etc.) of the other reviewers; 3) calculating the competency rating using different types of fabricated errors and assigning a relevancy weight designating the importance of each type (e.g. reviewer detection of a missing string is weighed higher than reviewer detection of switched strings, or vice versa).

Exemplary code for calculating the number of fabricated errors detected and/or missed by a reviewer comprises:

```
$num_errors_detected = (isset($statistics['summary']
['num_errors_detected'])) ? (int)
$statistics['summary']['num_errors_detected'] : 0;
  $projectStatistics->setNumErrorsDetected($num_errors_detected);
  $num_errors_overlooked = (isset($statistics['summary']
['num_errors_overlooked'])) ? (int)
$statistics['summary']['num_errors_overlooked'] : 0;
  $projectStatistics->setNumErrorsOverlooked($num_errors_overlooked);
```

In step 450, when a reviewer's competency rating is not at or above a designated threshold level as required for a translation project (e.g. falls below a guaranteed threshold standard), then the reviewer's quality rating of the original human translation is omitted from the record.

In step 460, the processor of system 300 calculates a Consensus Quality Rating (score) based on the ratings of the remaining competent reviewers. The calculation may comprise computations well known in the art, such as the mean, median, average, mode or it may comprise a customized algorithm that is encoded in the Quality Rating Module 400. If the Quality Rating is below a required threshold level, then the system can re-order the translation (automatedly or via a system administrator or user). The source text is sent to a different translator or machine and steps 410-460 are repeated as many times as required. The final Quality Rating may then, optionally, be transmitted via the network 110 to the customer electronic computing device 140 along with the original human translation in compliance with ensuring that the quality guaranteed has been met.

The customer's device 140 and/or the system 300 may also adjust the quality needed for the original human translation by adjusting parameters. Parameters adjusted comprise, by way of non-limiting examples: the number of reviewers used in rating the quality of the original human translation; altering methods of randomly inserting fabricated errors into the original translation (omitting strings; switching strings; etc.); altering the number of fabricated and/or original errors to be detected, and/or missed, by a reviewer (e.g. higher the number of errors, higher the quality); etc.

A quality level is designated automatedly by the customer's device 140 and/or the system 300 and/or manually by the system administrators, based on a variety of factors, such as: amount billed to the customer for the translation service (i.e. higher the fee, higher the guaranteed quality of the translation); amount of time available to conduct the translation; importance of text that is being translated and/or the customer (e.g. intended use of the translation, e.g. legal contract versus advertisement), and so forth.

Figure 7:
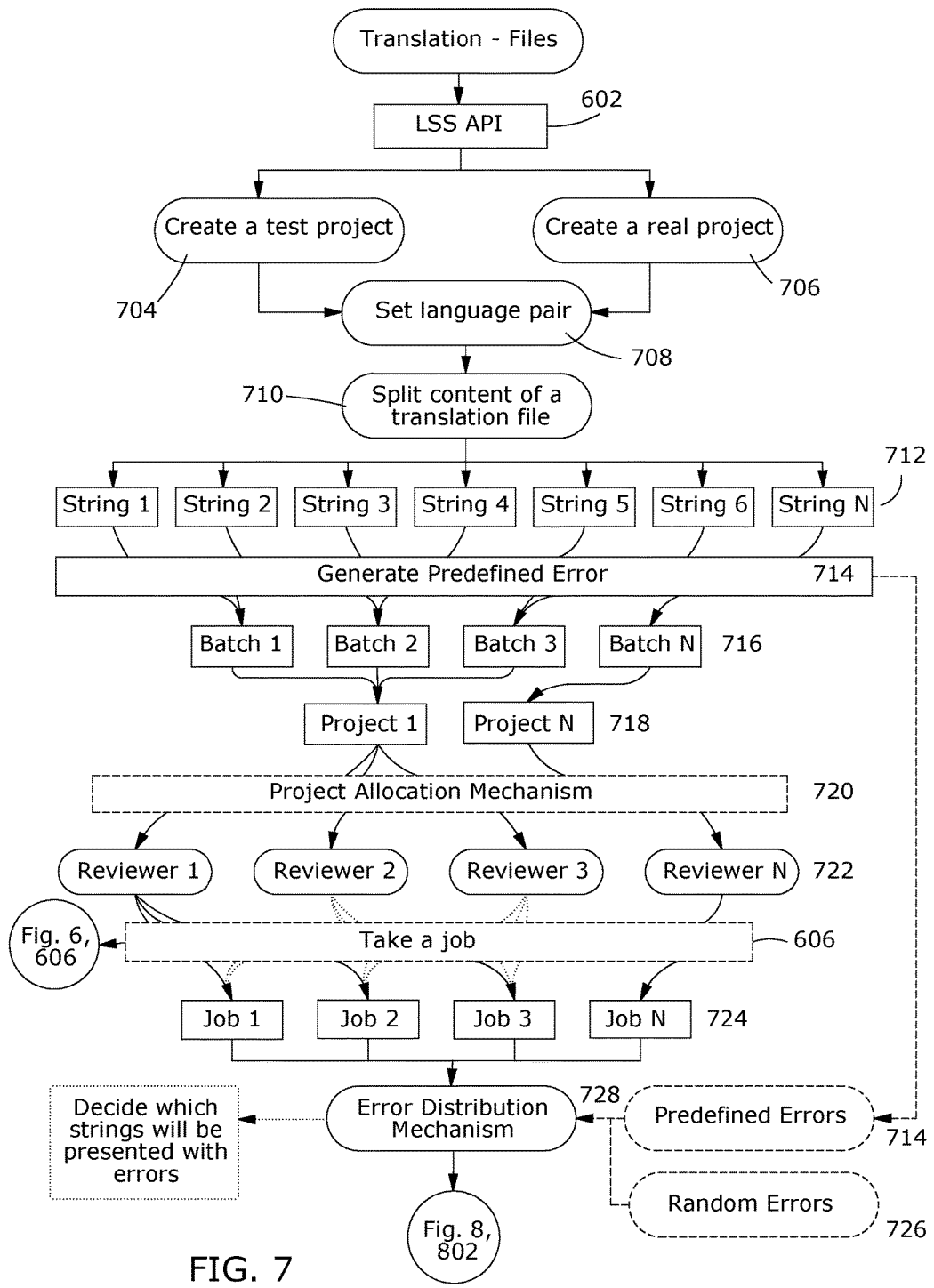
FIG. 7 is a flowchart of steps performed by the translation service provider computer in an exemplification to insert fabricated errors into some (a fraction) of the strings of the original translation to identify incompetent translation reviewers.
Figure 8:
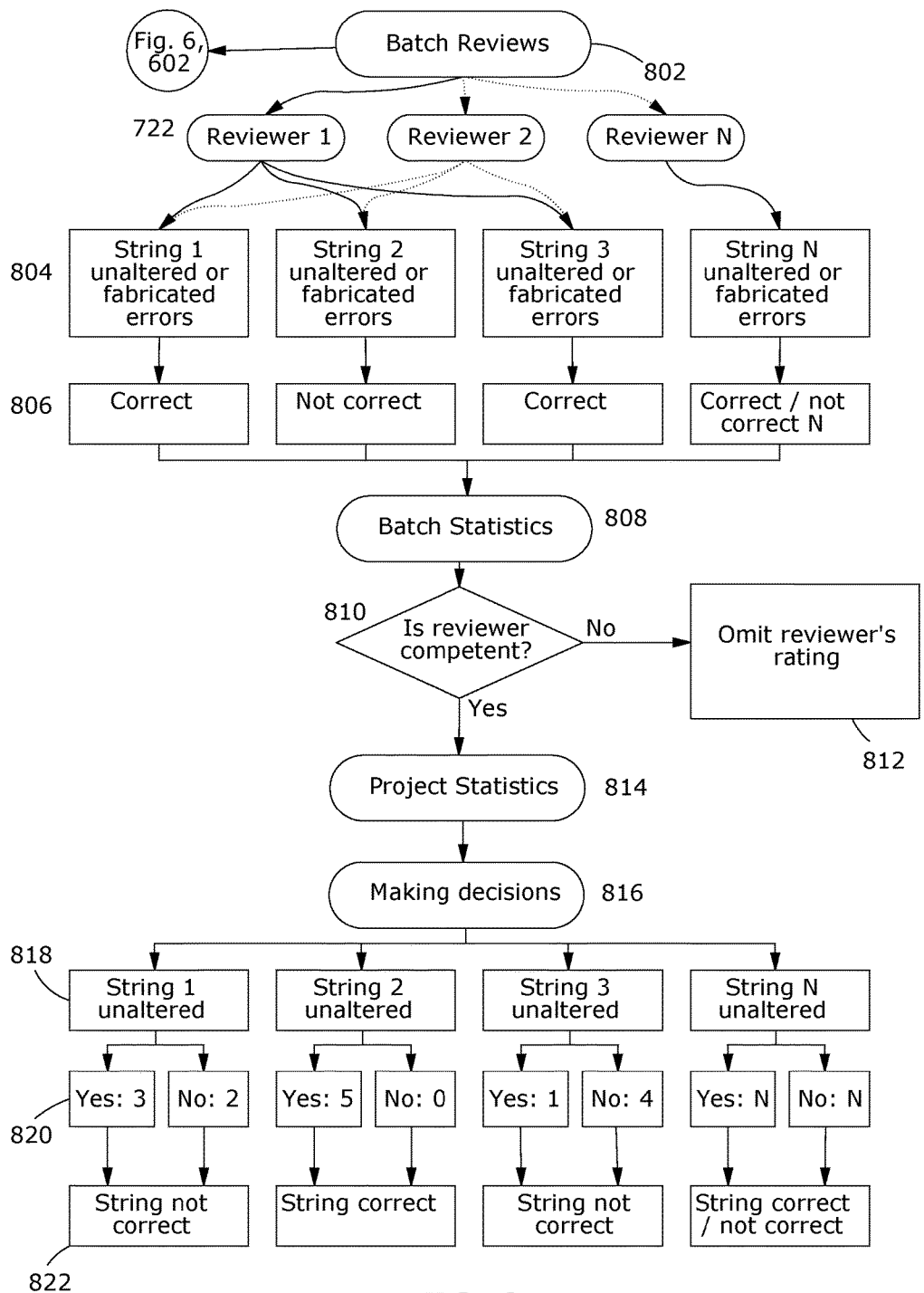
FIG. 8 is a flowchart of "batch review" steps performed after the steps of FIG. 7 to rate whether an original translation is correct or incorrect after the jobs-projects are sent to the plurality of reviewers, and incompetent reviewers are detected and their ratings removed.

In another embodiment comprising a more complicated process, as illustrated in FIGS. 4C, 7 and 8, the original translation is broken into parts (e.g. strings), and random (system generated) and predefined (customer selected) errors are inserted into some (e.g. a fraction) of the parts (step 470). The fraction, or total amount and/or types of fabricated errors inserted, may be a function of the level of quality of the original translation that is required by the customer (e.g. content author) and/or the intended use of the translation (e.g. legal document). For example, inserting errors into a plurality of the parts comprises inserting errors into a fixed percentage range of the parts, wherein the percentage range is determined by a customer's desired level of quality of the original translation (e.g. 10% average quality, versus 30% high quality).

In FIG. 4C, step 475, unaltered and fabricated error-ridden parts are then combined into different combinations (batches, and then projects). In an embodiment (e.g. see FIGS. 7 and 8), this step may further comprise grouping different unaltered and/or fabricated error-ridden parts into each of a plurality of batches, and a plurality of batches into a project, and assigning each reviewer a different project for the same customer's translation job.

Additionally, there may be overlap between projects assigned to different reviewers, wherein a percentage of the unaltered parts are in more than one batch or project, and are thus assigned to more than one reviewer. This overlap may comprise from about 70-90%, 80-90%, 80-95%, 90-95%, 90-100%, etc.

In one exemplary embodiment, each of five reviewers receives a project comprising thirty strings of different combinations from the same original translation. Of the thirty strings, five to six strings comprise fabricated errors of random and predefined error types that are inserted by the system and/or the administrator. Each reviewer's assigned project may have the same or different strings of fabricated errors, or the same strings with different fabricated error types. Additionally, each reviewer's project will also comprise about at least 80% of the same unaltered strings, so that at least four of the five reviewers each grade the same unaltered string.

In step 480, one project each comprising a unique combination of batches is assigned to each reviewer to grade (e.g. correct/incorrect per part). In step 430, the processor then determines which reviewers are competent based upon a consensus of the plurality of reviewers' ratings for the fabricated error-ridden parts.

In step 440, if a reviewer is determined to be incompetent, then this reviewer's rating of the unaltered parts within their assigned batches and project are omitted from the collection of other competent reviewers' ratings (450). Finally, in step 490, a determination of the quality of the original translation (e.g. pass/fail; correct/incorrect) is computed by the processor based on each competent reviewer's rating of each unaltered part within their assigned projects.

Additionally, if this consensus of quality rating of the original translation by the competent reviewers is below the quality level (a threshold rating) that the translation service provider ensured to the customer (e.g. content author), then the source text may be sent to another human translator or machine, retranslated, and the reviewer evaluation process repeated.

Figure 6:
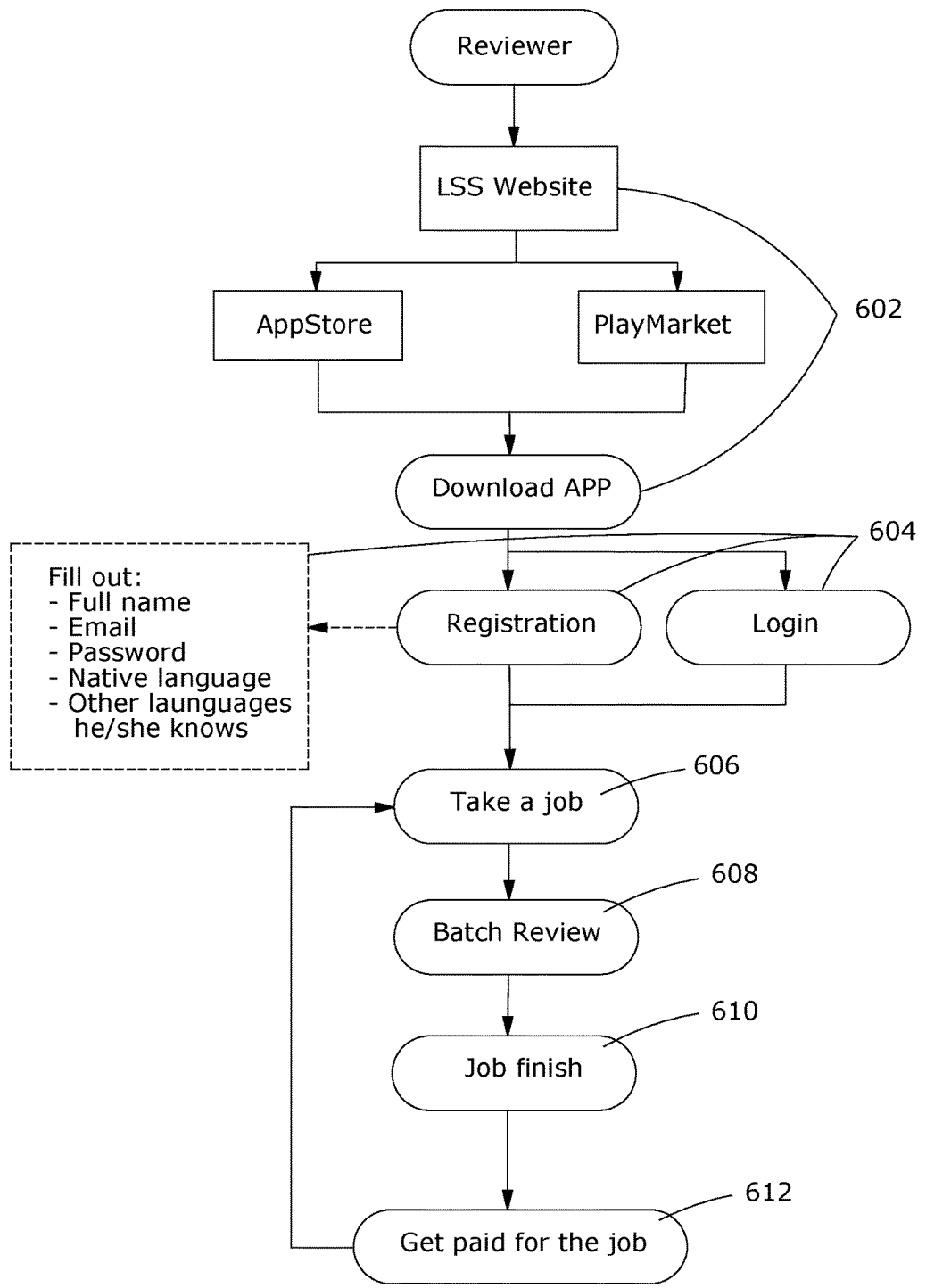
FIG. 6 illustrates the steps for a translation reviewer to register on the translation service provider computer system to accept a job comprising one project at a time to grade the quality of an original translation of content performed by another translator or machine.

FIGS. 6-8 illustrate a more detailed exemplification of the embodiment of FIG. 4C.

Translation Reviewer Registration

FIG. 6 illustrates the steps for a translation reviewer to register on the translation service provider computer system (FIG. 1, 300) to accept a job to grade the quality of an original translation performed by another translator or machine. In step 602, the translator review registers by going directly to the translation service provider's website, or by downloading a mobile app to their electronic computing device (FIG. 1, 200, 202). In step 604, the reviewer may be required to enter their personal information to register on the system, such as: full name, email, password, native language, other languages that they are competent in, etc. In step 606, the reviewer accepts a job posted on the translation service provider's system to review and rate the quality of a translation that was performed by another translator or machine.

Steps 608-612 occur after the systems steps of FIG. 7. After the fabricated errors have been inserted into some of the strings of the original translation and assigned to a translation reviewer, the system then performs a "batch review" 608 to collect each reviewer's grade (e.g. correct or not) for each of their assigned strings. After the reviewer submits their ratings to the system in step 610, the system will determine whether or not they are a competent reviewer based on if they were able to detect the errors inserted into strings of the original translation by the system. If they are deemed not to be a competent reviewer, then the system may decline to pay them or pay them only a small percentage of what was originally contracted for (step 612).

Fabricated Errors Insertion into Original Translation

FIG. 7 is a flowchart of steps performed by the translation service provider computer system (FIG. 1, 300) automatedly, and/or manually by the system's administrator, when hiring a plurality of reviewers to grade an original translation done by another entity comprising one or more human or machine translators. When a translation reviewer is new to the system 300, they may be evaluated for competency in their selected languages by being administered a test project (FIG. 7, 704), which may comprise one or more original translations with system or administrator fabricated errors inserted. If the brand-new reviewer achieves a passing grade, such as detecting a threshold number of fabricated errors, or the like (see FIG. 5), then in step 706 they are sent a real original translation project that the Translation Service Provider has been hired to ensure the quality of the translation.

In step 708, the "set language pair" occurs automatedly or manually by the administrator, and comprising the system processor (FIG. 3, 305) being provided the language that the source content is in, and the language that it is being translated to (i.e. "the original translation" target language).

In step 710, the file comprising the original translation is split into parts—e.g. strings 1-N (712).

In step 714, "generate predefined error", the processor 205 receives the types of errors that are unique to the translation project, such as: errors that the customer (FIG. 1, 140) asked to be specifically checked for in the original translation; errors that are common for that translation project; etc. In an embodiment, the customer may select how many predefined and/or random fabricated errors to insert as a function of the percentage of the entire content translated; and/or the number of errors can be computed based on the number of reviewers that will work in parallel to evaluate the accuracy of the original translation. And, the predefined errors may comprise: types of errors or content that the customer wants to guarantee are not in their original translation (e.g. offensive language); names of competing products and services and/or registered trademarks of another entity; terms that should not be translated, such as professional terms; and system administrator manually inserted strings with the appearance that they are translated strings.

In step 716, the system automatedly, or the administration manually, groups a plurality of different strings into batches 1-N (716). For example, batch 1 comprises strings 1, 3, and 5, and batch 2 comprises strings 2, 3, 4, and so forth.

In step 718, one or more batches, or a plurality of batches, is combined into one project (1-N). The number of batches within a project is determined by the administrator, and is a function of a reasonable amount of work that one reviewer can complete within the allotted time.

In step 720, "project allocation mechanism", the processor automatedly or the administrator automatically, assigns a specific project to a specific reviewer (722) (see also Appendix A-1. Project Allocation Function). When the reviewer accepts the project (step 606), then is becomes a reviewer's "job" (724) for which they are paid (per FIG. 6, 612) upon their submission to the system of their evaluation of whether each string within their job (project) was correct or not (FIG. 8). In one embodiment, each reviewer is only assigned one job per original translation; and in another embodiment, each competent reviewer can complete a job for an original translation, and then accept another job within the same original translation if time permits.

In step 728, the "error distribution mechanism" of the system automatedly inserts fabricated errors into a fraction or percentage of the strings of the project (e.g. 20%, 10-30%, etc.) before the job is sent to the reviewer, although all fabricated-altered and unaltered strings will have the errors made by the original translator, be it human or machine. (See also Appendix A-2. String Errors).

Two main types of errors are automatically inserted: the predefined errors (714); and random errors (726). The random errors 726 comprise a plurality of generic error types that are automatically selected for insertion into the original translation, such as: deleting or adding words or letters; swapping words or letters; mixing the source content with the original translation; mixing between translation of strings; common grammatical errors-misuse of prepositions, verb tenses, that versus which, etc. See also FIG. 9, Table 1 for a complete list of random error types that can be incorporated into the fabricated error-ridden strings.

FIG. 8 is a flowchart of "batch review" steps performed to rate whether an original translation is good or bad after the jobs-projects (FIG. 7, 724) are sent to the plurality of reviewers. In step 804, each reviewer will rate each string (unaltered and with fabricated errors) within their batch as correct or incorrect (806). Again, some, or the majority of, the strings may not have any system fabricated errors inserted (either predefined errors 714, or random errors 726) and thus remain "unaltered" with just the original translator's or machine translation errors.

The system then performs a validation test to remove incompetent reviewer's string ratings. Steps 810-812 are similar to FIG. 4A, steps 440-460 wherein the system is able to detect incompetent reviewers when they fail to rate a fabricated error-ridden string as "incorrect". The system, or the administrator then decides which reviewer's ratings or the unaltered strings to eliminate (812). After the validation test is performed, steps 814-822 comprise rating the original translation as either good or bad, correct or incorrect, etc. based on the ratings of the remaining competent reviewers for each unaltered string within their assigned batch. (See also Appendix A-3. Project Statistics, which provides exemplary computer code for step 814). The unaltered strings are from the original translation and do not contain any system or administrator fabricated errors. The competent reviewers have previously rated each unaltered string 818 (without inserted fabricated errors) as "Yes" or "No" to indicate correct or incorrect. In another embodiment, the reviewers can rate the accuracy of the translation on a scale of 1-10, or a percentage—e.g. 70% correct. In the exemplification of FIG. 8, step 820, three competent reviewers rated string 1 as correct, and two reviewers rated it as incorrect; five competent reviewers rated string 2 is correct and no reviewer rated it incorrect; and so forth. In the exemplification of step 822, a simple majority of the combined competent reviewers' ratings determine whether the string is rated as correct or incorrect. The ratings of the individual unaltered strings within a project are combined, and based on a majority of the correct/incorrect ratings, or another scale (which may be defined by the customer who orders a—e.g. 90% high quality translation), then the system determines whether or not the original translation is a correct translation and informs the customer.

Conclusion

The results of the operation of the novel process described above is a fast and efficient way to order and receive an original human or machine translation while ensuring its quality, even if the translation service provider system, customer (e.g. content author), and/or system administrator is not proficient in the target language. The aforementioned computer flowcharts and diagrams illustrate the architecture, functionality, and operation of possible implementations of systems, methods, apparatuses, devices and media according to various embodiments of the present disclosure. In this regard, each block in the flowchart or block diagrams may represent a module, segment, or portion of code, and the hardware it is installed upon, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Likewise, the terms "plurality" may be used throughout the specification to describe two or more components, devices, elements, units, parameters, or the like. Unless explicitly stated, the method embodiments described herein are not constrained to an order or sequence. Additionally, some of the described method embodiments or elements thereof can occur or be performed at the same point in time.

Although various features of the invention may be described in the context of a single embodiment, the features may also be provided separately or in any suitable combination. Conversely, although the invention may be described herein in the context of separate embodiments for clarity, the invention may also be implemented in a single embodiment.

It is to be understood that the phraseology and terminology employed herein is not to be construed as limiting and are for descriptive purpose only; and that the details set forth herein do not construe a limitation to an application of the invention.

Furthermore, it is to be understood that the invention can be carried out or practiced in various ways and that the invention can be implemented in embodiments other than the ones outlined in the description above.

APPENDIX A

APPENDIX A

1. Exemplary Computer Code for Project Allocation Mechanism- FIG. 7, 720

```
public function allocate(Project $project)
  {
    if ($this->isManualAllocationEnabled($project)) {
      return false;
    }

$this->registerStrategies($project);

$strategiesAllocation = $this->am->allocate();
    $strategiesNumber = count($strategiesAllocation);

if ($strategiesNumber < 1) {
      return false;
    }

$emptyStrategiesNumber = 0;
    foreach ($strategiesAllocation as $name => $allocatedUsers) {
      if (count($allocatedUsers) < 1) {
        $emptyStrategiesNumber++;
        continue;
      }

$this->allocateUsers($project, $allocatedUsers, $name);
    } if ($emptyStrategiesNumber >= $strategiesNumber) {
      return false;
    } return true;
```

2. Exemplary Partial Computer Code for Generating Fabricated String Errors- FIG. 7

```
public function getStringErrors($job, $isOldJob = false)
  {
    $em = $this->container['doctrine.entityManager'];
    $eventDispatcher = $this->container['crowdqa.eventDispatcher'];
    $storage = Storage\Factory::getStorage($this->container);
    $userLevel = Experience::getUserLevel($em, $this->getUser()->getId());

$errorGenerator = new Error\Generator($this->container);
```

```
    try {
      if ($userLevel >= Experience::$userLevelForUsingBatchErrors) {
        $errors = $storage::load(Error\LoaderForBatch::getKey($job->getBatch()));
      } elseif ($isOldJob) {
        $errors = $storage::load(Error\Loader::getKey($job));
      } else {
        $errors = $errorGenerator->generate($job->getBatch(), new Error\Rule\Job($this->container,
$job->getBatch()->getProject()->getTargetLang()));
            $eventDispatcher->dispatch(
                "ErrorGenerated", new Error\Event\ErrorGenerated($job, $errors)
            );
      }
    } catch (Storage\Exception\StorageLoadException $e) {
      $errors = array(
          'strings' => []);
    } if (is_array($errors)) {
      $errors = (object)$errors;
    } if (is_string($errors)) {
      $errors = json_decode($errors);
    } return $errors;
  }
```

3. Exemplary Computer Code for Project Statistics Calculation- FIG. 8, step 814

```
<?php namespace OHT\Modules\Post\Cmd;

use com\OHT\Lib\Resources\Resource;
use OHT\Modules\Post\Event\ProjectLssAddedEvent;
use OHT\Modules\Project\Event\ProjectEvent;

/**
 * Description of CmdAddLSSReport
 *
 * @author david
 */
class CmdAddLSSReport {

/** @var \TranslationProject */
```

```
private $project;

function __construct(\TranslationProject $project) {
    $this->project = $project;
} function __invoke(\Model_Resource $resource, array $report) {
    $report['strings'] = array_map(function (array $ar) {
        $ar['is_wrong'] = !$ar['num_yes'] || (int) $ar['num_no'] / (int) $ar['num_yes'] >= 0.4 ? 1 : 0;
        return $ar;
    }, $report['strings']);

$is_empty_source        =        !isset($report['strings'][0]['source_string'])        ||
empty($report['strings'][0]['source_string'])? true : false;
    if($is_empty_source){
        $project_trans_resource        =        \Model_ProjectResourceQuery::create()-
>findOneByResourceId($resource->getId());
        $report['source_resource_id'] = $project_trans_resource->getParentResourceId();
        $report['type'] = "text";
    }
    else{
        $report['type'] = "xtm";
    }

$lls_report = json_encode($report);
    $lss_resource   =   Resource::createFileResource('lss_report',   null,   'application/json',
strlen($lls_report), null, $lls_report);
    $lss_resource->save();

$this->project->addResource($lss_resource,
\Model_Resource::RESOURCE_CONTEXT_LSS_REVIEW, 0, $resource);
    \ProjectEvent::createNewEvent(\ProjectEvent::TYPE_LSS_COMPLETED, $this->project);
    $this->project->getEventDispatcher()->dispatch(ProjectEvent::PROJECT_LSS_ADDED,        new
ProjectLssAddedEvent($this->project,$resource,$report));
    }

}
```

What is claimed is:

1. An Internet based translation service provider system for ensuring the quality of human and/or machine textual translations from a source language to a target language, comprising:
   a. a system server, comprising:
      i. a database comprising a plurality of human translators' records and translator reviewers' records comprising the identity of each translator's and reviewer's native language;
      ii. one or more processors communicatively coupled to a memory;
      iii. one or more non-transitory computer-readable storage devices comprising instructions for processor(s), wherein said processors are configured to execute said instructions to perform operations comprising;
         receiving by the processor over a computer network, an original human or machine translation from a customer requiring an independent evaluation of the translation, wherein the original translation may comprise one or more translation errors;
         breaking the original translation into a plurality of unaltered parts comprising one or more of sentences, paragraphs, and/or strings, with the one or more translation errors, and further inserting fabricated errors into a percentage of the unaltered parts to generate fabricated error-ridden parts;
         transmitting by the processor a plurality of the unaltered parts and the fabricated error-ridden parts of the original translation to a plurality of human translation reviewers, and receiving back a reviewer rating on whether each unaltered and fabricated error-ridden part is correct or incorrect;
         assigning a competency rating to each translation reviewer based on the reviewer's ability to detect the fabricated error-ridden parts;
         when a reviewer's competency rating is below a threshold, then omitting by the processor the reviewer's rating of the unaltered parts of the original translation;
         calculating a consensus quality rating of a plurality of remaining competent reviewers based on a translation quality of the unaltered parts of the original human translation; and,
         wherein the translation service provider, administrator and a customer are not required to know: 1) the target language; 2) the reliability and accuracy of the human or machine translator; and/or, 3) the reliability and accuracy of each reviewer within the plurality of reviewers
   b. one of more human translator electronic computing devices, or machine translation devices, for communicating over a network with the system server to perform translations of text;
   c. one or more translation reviewer electronic computing devices for communicating over a network with the system server to rate the quality of the original translation;
   d. one or more customer electronic computing devices for ordering a quality evaluation of the original translation that they have ordered from the translation service provider system or from another entity; and,
   d. an Internet network for transmitting electronic communications between the electronic computing devices and the server system.

2. The system of claim 1, wherein breaking the original translation into parts further comprises, grouping different unaltered and fabricated error-ridden parts into each of a plurality of batches.

3. The system of claim 2, wherein each of the plurality of batches is combined into a project comprising a unique set of fabricated and unaltered parts, and assigning each reviewer a different project.

4. The system of claim 3, wherein each unaltered part is graded by 70-100% of the assigned reviewers.

5. The system of claim 1, wherein inserting errors into a plurality of the parts further comprises inserting fabricated errors into a fixed percentage range of the parts, wherein the percentage range is determined by a desired level of quality of the original translation.

6. The system of claim 1, wherein the desired level of quality of the original translation is a good/bad or a pass/fail rating, and the parts are rated as correct or incorrect by each reviewer.

7. The system of claim 2, wherein assigning a competency rating to each translation reviewer further comprises one or more methods of calculating by the processor:
   a. the number or percentage of fabricated errors detected, and/or missed, by each reviewer for the error-ridden parts within the reviewer's assigned project; and/or
   b. assigning a relevancy weight designating the importance of each type of fabricated error inserted into a fraction of the parts, and computing a sum of all the weighted types of fabricated errors detected or missed.

8. The system of claim 1, wherein the fabricated inserted errors comprise, 1) random errors selected by the system and/or system administrator comprising common translation errors, and/or 2) predefined errors selected by the customer to ensure that a specific error type is omitted from the original translation.

9. A computer implemented method for ensuring the quality of textual translations from a source language to a target language by a networked based translation service provider, comprising:
   a. receiving by a processor over a computer network, an original translation comprising a plurality of translation errors, and breaking the original translation into a plurality of parts comprising one or more of sentences, paragraphs, and/or strings, and inserting fabricated errors into a percentage of the parts while leaving the remaining parts unaltered;
   b. transmitting by the processor the unaltered parts and fabricated error-ridden parts of the original translation to a plurality of human translation reviewers, and receiving back a reviewer rating on whether each unaltered and fabricated error-ridden part is a correct or incorrect language translation;
   c. assigning a competency rating to each reviewer based on the reviewer's ability to detect errors within the fabricated error-ridden parts;
   d. when a reviewer competency rating is below a threshold, then omitting by the processor the reviewer's rating of the unaltered parts of the original translation;
   e. calculating a consensus quality rating of a plurality of remaining competent reviewers based on the quality of the unaltered parts of the original human translation; and,
   f. wherein the translation service provider and a customer are not required to know: 1) the target language; 2) the reliability and accuracy of the human translator or machine; and/or, 3) the reliability and accuracy of each reviewer within the plurality of reviewers.

10. The computer implemented method of claim 9, wherein the inserted fabricated errors comprise, 1) random errors selected by the system and/or system administrator comprising common translation error types; and 2) predefined errors selected by the customer to ensure that a specific error or error type was omitted from the original translation.

11. The computer implemented method of claim 10, wherein randomly inserting fabricated errors into the original human translation further comprises one or more methods of: substituting a machine translation for one or more parts; switching two or more translated parts; inserting a specific number of errors and/or type of errors.

12. The computer implemented method of claim 9, wherein breaking the original translation into parts further comprises grouping a different unaltered and fabricated error-ridden parts into each of a plurality of batches, and a plurality of batches into a project, and assigning each reviewer a different project.

13. The computer implemented method of claim 9, wherein each unaltered part is graded by 70-100% of the assigned reviewers.

14. The computer implemented method of claim 9, wherein inserting fabricated errors into a plurality of the parts comprises inserting one or more random and/or customer predefined errors into a fixed percentage range of the parts, wherein the percentage range is determined by a desired level of quality of the original translation.

15. A non-transitory computer-readable storage media comprising instructions that, when executed by one or more processors, performs a method for ensuring the quality of textual translations from a source language to a target language by a networked based translation service provider, the method comprising:
   a. receiving by a processor over a computer network, an original human or machine translation comprising translation errors and breaking the original translation into unaltered parts comprising sentences, paragraphs, and/or strings;
   b. inserting fabricated errors into a fraction of the unaltered parts, and combining a plurality of unaltered parts and fabricated error-ridden parts into different groups, wherein each group creates a batch, and one or more batches creates a project;
   c. transmitting by the processor one project to each of a plurality of human translation reviewer's computers, and receiving back a translation reviewer's rating on a quality of each unaltered part and fabricated error-ridden part within the project;
   d. assigning a competency rating to the translation reviewer based on the reviewer's rating of the fabricated error-ridden parts, wherein when a reviewer's competency rating is below a threshold, then the reviewer is classified as incompetent, and the processor omits the incompetent reviewer's rating for the unaltered parts of the original translation;
   e. calculating a consensus quality rating of the original human translation unaltered parts from a plurality of competent reviewers; and,
   f. wherein the translation service provider and the customer are not required to know: 1) the target language; 2) the reliability and accuracy of the human or machine translator; and/or, 3) the reliability and accuracy of the reviewer within the plurality of reviewers.

16. The non-transitory computer-readable storage media of claim 15, wherein the inserted fabricated errors comprise, 1) random errors selected by the system and/or system administrator, and 2) predefined errors selected by the customer to ensure that a specific error or error type was omitted from the original translation.

17. The non-transitory computer-readable storage media of claim 15, further comprising computing a number of reviewers required to ensure the quality of the original translation based on one or more parameters comprising: the importance of a customer ordering the original human translation; the importance of a project requiring the original human translation; and the amount of time available before the deadline for the original human translation.

18. The non-transitory computer-readable storage media of claim 15, wherein assigning a competency rating further comprises one or more methods of calculating by the processor:
   a. the number or percentage of fabricated errors detected, and/or missed, by each reviewer within the reviewer's assigned project; and/or
   b. assigning a relevancy weight designating the importance of each type of fabricated error inserted into a fraction of the parts, and computing a sum of all the weighted types of errors detected or missed.

19. The non-transitory computer-readable storage media of claim 15, wherein breaking the original translation into parts and inserting fabricated errors into a plurality of the parts, further comprises grouping different unaltered and fabricated error-ridden parts into each of a plurality of batches, and a plurality of batches into a project, and assigning each reviewer a different project.

20. The non-transitory computer-readable storage media of claim 19, wherein a percentage of the unaltered parts are in more than one batch or project, and is assigned to more than one reviewer, comprises from about 70-100%.

* * * * *